United States Patent
Wang

(10) Patent No.: US 10,917,497 B2
(45) Date of Patent: Feb. 9, 2021

(54) METHOD, SYSTEM, DEVICE AND SERVER FOR DETERMINING TRANSMISSION QUALITY OF NODE

(71) Applicant: WANGSU SCIENCE & TECHNOLOGY CO., LTD., Shanghai (CN)

(72) Inventor: Zhibin Wang, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/665,085

(22) Filed: Oct. 28, 2019

(65) Prior Publication Data
US 2020/0314209 A1 Oct. 1, 2020

Related U.S. Application Data

(63) Continuation of application No. PCT/CN2019/086051, filed on May 8, 2019.

(30) Foreign Application Priority Data

Mar. 27, 2019 (CN) .......................... 2019 1 0239139

(51) Int. Cl.
*H04L 29/08* (2006.01)
(52) U.S. Cl.
CPC ........ *H04L 67/322* (2013.01); *H04L 67/1076* (2013.01); *H04L 67/1085* (2013.01); *H04L 67/1091* (2013.01)
(58) Field of Classification Search
CPC .............. H04L 67/322; H04L 67/1076; H04L 67/1085; H04L 67/1091
See application file for complete search history.

(56) References Cited

U.S. PATENT DOCUMENTS

| 2014/0247885 A1* | 9/2014 | Brueck .............. H04N 21/6125 375/240.24 |
| 2015/0071284 A1* | 3/2015 | Sinky ................. H04N 21/6375 370/392 |

(Continued)

FOREIGN PATENT DOCUMENTS

| CN | 101730991 A | 6/2010 |
| CN | 102547789 A | 7/2012 |

(Continued)

OTHER PUBLICATIONS

Journal article "Dynamic retry adaptation scheme to improve transmission of H.264 HD video over 802.11 peer-to-peer networks" (Dec. 15, 2015) to Sinky et al. ("Sinky—15") (Year: 2015).*

*Primary Examiner* — June Y Sison
(74) *Attorney, Agent, or Firm* — Heslin Rothenberg Farley & Mesiti P.C.

(57) ABSTRACT

Some embodiments of the present application disclose a method, system, device, and server for determining transmission quality of a node, wherein the method comprises: acquiring data transmission information of a preset number of data slices transmitted from a first peer node to a second peer node and before a first slice in the data slices (S11); determining, according to the data transmission information, a data transmission success rate factor corresponding to the first slice (S12); determining, according to the data transmission information, a transmission speed factor corresponding to the first slice (S13); and determining, according to the transmission success rate factor and the transmission speed factor, transmission quality of data transmission from the first peer node to the second peer node (S14). The technical solutions provided by embodiments of the present application can timely judge the transmission quality of the node and improve the transmission efficiency of P2P.

18 Claims, 5 Drawing Sheets

(56) References Cited

U.S. PATENT DOCUMENTS

2018/0367585 A1* 12/2018 Lu ...................... H04N 21/6125
2018/0375930 A1* 12/2018 Chen ................... H04L 67/1078
2020/0296603 A1* 9/2020 Suthar .................... H04L 41/12

FOREIGN PATENT DOCUMENTS

| | | |
|---|---|---|
| CN | 102843257 A | 12/2012 |
| CN | 102904773 A | 1/2013 |
| CN | 103188169 A | 7/2013 |
| CN | 103718532 A | 4/2014 |
| CN | 104539917 A | 4/2015 |
| CN | 105553781 A | 5/2016 |
| CN | 105872001 A | 8/2016 |
| CN | 106210089 A | 12/2016 |
| CN | 106341339 A | 1/2017 |
| CN | 107277134 A | 10/2017 |
| CN | 108307213 A | 7/2018 |
| CN | 108512921 A | 9/2018 |
| CN | 109347968 A | 2/2019 |
| WO | 2009103343 A1 | 8/2009 |
| WO | 2010138972 A2 | 12/2010 |
| WO | 2012047927 A1 | 4/2012 |

\* cited by examiner

METHOD, SYSTEM, DEVICE AND SERVER FOR DETERMINING TRANSMISSION QUALITY OF NODE

CROSS REFERENCE TO RELATED APPLICATIONS

The present disclosure is a continuation of international application No. PCT/CN2019/086051, filed on May 8, 2019, and titled "METHOD, SYSTEM, DEVICE AND SERVER FOR DETERMINING TRANSMISSION QUALITY OF NODE", which is incorporated herein by reference in its entirety. The PCT application claims priority to Chinese Patent Application No. 201910239139.4, filed on Mar. 27, 2019, entitled "METHOD, SYSTEM, DEVICE AND SERVER FOR DETERMINING TRANSMISSION QUALITY OF NODE", which is incorporated by reference in its entirety.

TECHNICAL FIELD

The present application relates to the field of Internet technologies, and in particular, to a method, system, device, and server for determining transmission quality of a node.

BACKGROUND

P2P (peer-to-peer) technology (i.e., peer-to-peer network transmission technology) is a new type of Internet communication transmission technology in recent years. It breaks a traditional server/client (C/S) mode for networks in terms of transmission mode, and establishes a direct communication mechanism of client to client. In a peer-to-peer network, each node serves as a client as well as a server for others. Each node of the network shares a portion of the hardware resources of its own (processing capability, storage capacity, network connectivity, printers, etc.). The shared resources provide services and content over the network and could be accessed directly by other peers (Peer) without going through intermediate entities. The peer-to-peer network is a successful extension to the distributed concept, which distributes a server burden in the traditional mode to each node in the network, and thus it not only greatly reduces the processing pressure of the server, but also saves a lot of CDN traffic costs.

In the existing P2P technology, a peer node could obtain information on other peer nodes from a node management server, thereby establishing a communication connection with other peer nodes to acquire data. In the stream media live broadcast application based on P2P, especially in the low-latency stream media live broadcast application, the transmission quality of the peer node is generally required to be high. If the transmission quality of the peer node for providing data is poor, the experience of the user at the receiving end is poor. Therefore, it is necessary to judge the transmission quality of the peer node to determine if the receiving end has to be switched to other peer nodes to receive data.

At present, the method for determining the quality of a peer node generally relates to determining the transmission quality of a peer node for providing data according to data transmission information received by a peer node for receiving data; the transmission information is, for example, a client delay, a P2P sharing rate, etc. If it is determined that the transmission quality of the peer node for providing data is poor, the peer node for receiving data may be disconnected from the current connection and switched to another peer node that could provide data. However, the existing determination on the transmission quality of the peer node for providing data is performed by the peer node for receiving data. Due to the perception hysteresis at the receiving end, the degradation of the transmission quality of the transmitting end is generally found only after the transmission efficiency has been lowered; and then the receiving end has to be switched to a new peer node to receive data, which would cause more useless data sent by the previous transmitting end, thereby wasting bandwidth resources. Therefore, it is necessary to provide a time-efficient method for determining the transmission quality of a node, so as to judge the transmission quality of the node timely and ensure an efficient usage of bandwidth resources, thereby improving the transmission efficiency of P2P.

SUMMARY

The object of some embodiments of the present application is to provide a method, system, device, and server for determining transmission quality of a node, which can timely judge the transmission quality of the node and improve the P2P efficiency To achieve the above object, one aspect of embodiments of the present application provides a method for determining transmission quality of a node, comprising:

acquiring data transmission information on a preset number of data slices transmitted from a first peer node to a second peer node and before a first slice in the data slices;

determining, according to the data transmission information, a data transmission success rate factor corresponding to the first slice;

determining, according to the data transmission information, a transmission speed factor corresponding to the first slice; and determining, according to the data transmission success rate factor and the transmission speed factor, transmission quality of data transmitted from the first peer node to the second peer node.

To achieve the above object, another aspect of embodiments of the present application provides a system for determining transmission quality of a node, comprising: a first peer node and a second peer node, wherein the first peer node is configured to acquire data transmission information on a preset number of data slices transmitted from a first peer node to a second peer node and before a first slice in the data slices; determine, according to the data transmission information, a data transmission success rate factor corresponding to the first slice; determine, according to the data transmission information, a transmission speed factor corresponding to the first slice; and determine, according to the data transmission success rate factor and the transmission speed factor, transmission quality of data transmitted from the first peer node to the second peer node; wherein, the data transmission information comprises total data amount of each of the data slices, valid time of each of the data slices, and actual transmission data amount of each of the data slices within the valid time; and the second peer node is configured to receive data slices sent by the first peer node.

To achieve the above object, another aspect of embodiments of the present application further provides a device for determining transmission quality of a node, comprising: for determining transmission quality of a node, comprising: a unit for acquiring transmission information, a unit for determining success rate factor, a unit for determining speed factor, and a unit for determining transmission quality; wherein the unit for acquiring transmission information is configured to acquire data transmission information on a preset number of data slices transmitted from a first peer node to a second peer node and before a first slice in data slices; the data transmission information comprises total data amount of each of the data slices, valid time of each of the data slices, and actual transmission data amount of each of the data slices within the valid time;

the unit for determining success rate factor is configured to determine, according to the data transmission information, a data transmission success rate factor corresponding to the first slice;

the unit for determining speed factor is configured to determine, according to the data transmission information, a transmission speed factor corresponding to the first slice;

the unit for determining transmission quality is configured to determine, according to the data transmission success rate factor and the transmission speed factor, transmission quality of data transmitted from the first peer node to the second peer node.

To achieve the above object, another aspect of embodiments of the present application further provides a server, comprising a memory and a processor, wherein, the memory is configured for storing a computer program that, when being executed by the processor, implements the method performed in the above method implementation.

Therefore, the technical solution provided by an embodiment of the present application acquires data transmission information of a data slice that has been transmitted by the first peer node and before the first slice for providing data, the data transmission information comprising total data amount of each data slice, valid time of each data slice, and actual transmission data amount of each data slice within the valid time; and then respectively calculates data transmission success rate factor and transmission speed factor, corresponding to the first slice, according to the data transmission information, wherein, the data transmission success rate factor is related to the success rate of the transmitted data slices, and the transmission speed factor is related to the transmission speeds of the transmitted data slices. As such, the calculated data transmission success rate factor and transmission speed factor could well reflect the transmission quality for each of the data slices before the first slice is transmitted, and thus could be used for pre-determining whether the transmission quality is good before the first slice is transmitted by the first peer node. Therefore, the transmission quality of the node may be determined timely at the first peer node (that is, the transmitting end), thus improving the P2P efficiency. At the same time, the selected data transmission information is the transmission information of several data slices adjacent to the first slice, which would grantee that the data transmission information configured for determining the quality of node is the data transmission information during a short time, and the accuracy of the determination result may be ensured.

BRIEF DESCRIPTION OF THE DRAWINGS

In order to more clearly illustrate the technical solutions in embodiments of the present application, the drawings used in description of the embodiments will be briefly described below. It is obviously to those skilled in the art that the drawings in the following description are only some embodiments of the present application, and other drawings can be obtained according to these drawings without any creative work.

DETAILED DESCRIPTION

In order to make the objects, technical solutions and advantages of the present application more clear, the embodiments of the present application will be further described in detail below with reference to the accompanying drawings.

Figure 1:
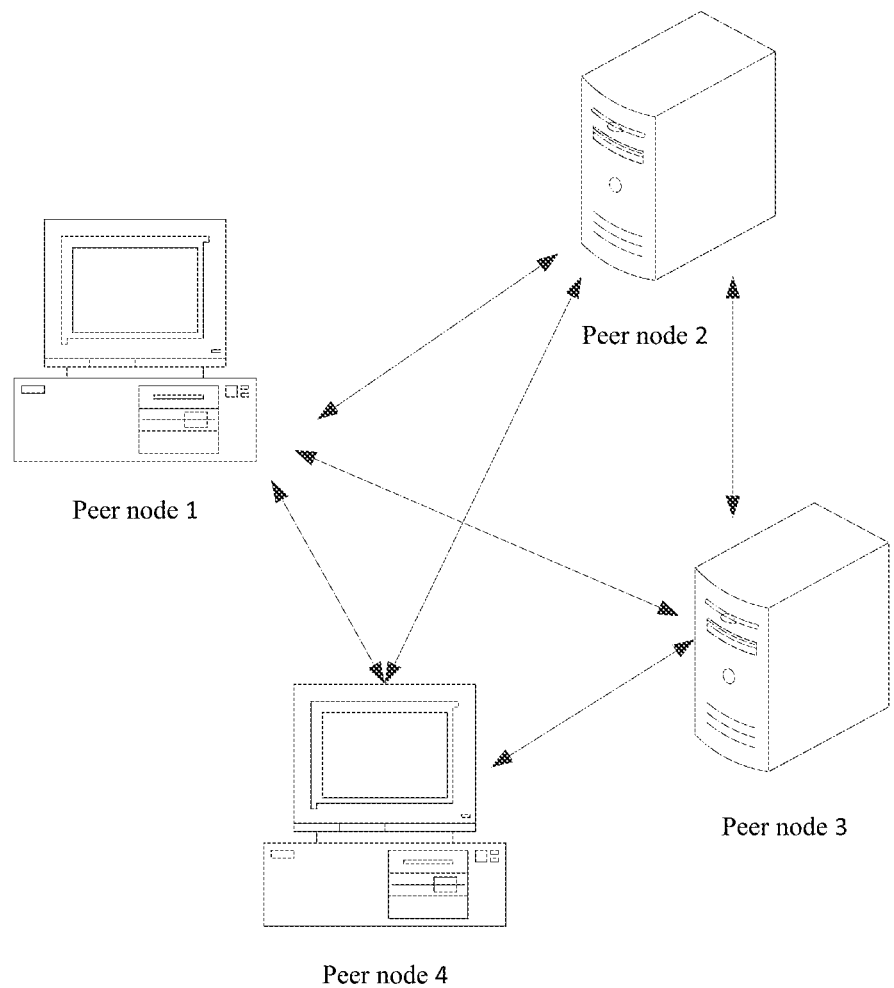
FIG. 1 is a schematic diagram of a P2P network in an embodiment of the present application.

The present application provides a method for determining transmission quality of a node. The method could be applied to the field of P2P technology, and in particular, a stream media transmission technology based on P2P technology, such as a stream media live broadcast technology based on P2P technology. Referring to FIG. 1, a P2P network may include a plurality of peer nodes. Any one of the peer nodes could establish a connection with other nodes in the P2P network for data transmission. The peer node could be a client, a server or a server cluster, etc.

Figure 2:
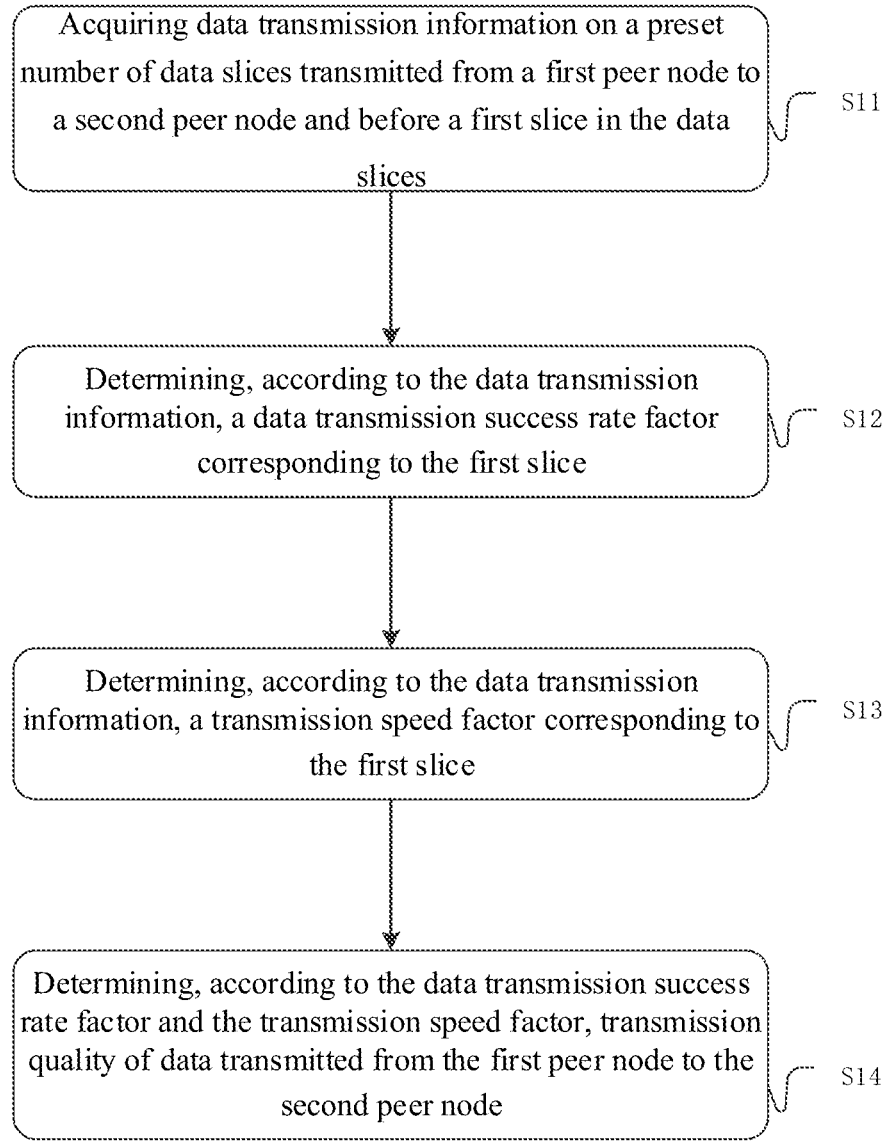
FIG. 2 is a flowchart of a method for determining transmission quality of a node in an embodiment of the present application.

FIG. 2 is a flow chart of a method for determining transmission quality of a node in a method embodiment of the present application. Referring to FIG. 1 and FIG. 2, the method for determining transmission quality of a node provided by the present application may include the following steps.

S11: acquiring data transmission information on a preset number of data slices transmitted from a first peer node to a second peer node and before a first slice in the data slices.

The first peer node may provide data. The second peer node may receive data of the first peer node. The first peer node and the second peer node may be any of nodes in the P2P network.

When the first peer node transmits data to the second peer node, the data to be transmitted may generally be sliced to obtain data slices; and the data slices are then transmitted to the second peer node.

The first slice may be configured to represent a data slice to be transmitted immediately.

Each data slice may correspondingly has a total data amount and a valid time. The data amount transmitted within the valid time is an actual transmission data amount. The valid time may be configured to indicate the timeliness of the data slice. The valid time is a time period during which the data slice could be transmitted. That is, the data of the data slices actually transmitted within the valid time is valid, and the data of the data slice transmitted out of the valid time is invalid. For example, the valid time corresponding to a data slice is 2 seconds, and in the actual transmission process, the actual transmission data amount transmitted within 2 seconds is 80% of the total data amount of the data slice, and the remaining 20% data amount of the data slice transmitted unsuccessfully is invalid.

When it is necessary to determine whether the transmission quality of the data transmission from the first peer node to the second node, performed before sending the first slice, is qualified, the determination may be performed according to the transmission condition of several data slices before the first slice.

The data transmission information of a preset number of data slices before the first slice in the data slices transmitted by the first peer node to the second peer node may be acquired. The preset number may be selected according to actual conditions, for example, the preset number may be 5, 10, etc.

Generally, the greater the value of the preset number is, the higher the accuracy of the final result is.

In one embodiment, the data transmission information may include a total data amount of each data slice, a valid time of each data slice, and an actual transmission data amount of each data slice within the valid time.

In an embodiment, when a previous slice before the first slice is being transmitted and the transmission information of the slice cannot be acquired, the actual transmission data amount of the slice may be set to 0. That is, if the transmission time for the previous one slice before the first slice does not reach the valid time and the actual transmission data amount does not reach the total data amount of the slice, the actual transmission data amount in the data transmission information may not be obtained, and the actual transmission data amount of the slice could be set to 0, that is, the influence of the actual transmission data amount of the slice on the transmission quality between the nodes will not be taken into account.

S12: determining, according to the data transmission information, a data transmission success rate factor corresponding to the first slice.

The data transmission success rate factor corresponding to the first slice may be determined according to the data transmission information. The data transmission success rate factor may be configured to indicate the transmission success rate of a preset number of data slices before the first slice.

In an embodiment, determining, according to the data transmission information, a data transmission success rate factor corresponding to the first slice may comprises: determining a transmission success weight value of each of the preset number of data slices before the first slice, according to the total data amount of each of the data slice and actual transmission data amount of each of the data slice; and calculating, according to the transmission success weight values of each of the data slices, the data transmission success rate factor corresponding to the first slice.

The transmission success weight value may be configured to indicate the reference of the transmitted data slice to the success of transmission of the first slice. The higher the transmission success weight value is, the higher the reference of the successfully transmitted data slice to the success of transmission of the first slice is.

In an embodiment, determining a transmission success weight value of each of the preset number of data slices before the first slice, according to the total data amount of the data slice and the actual transmission data amount of the data slice may specifically comprise: if the actual transmission data amount of the data slice is less than the total data amount of the data slice, the transmission success weight value of the data slice is 0; and if the actual transmission data amount of the data slice is equal to the total data amount of the data slice, the transmission success weight value of the data slice is determined according to a preset rule. That is, if the actual transmission data amount of the data slice is less than the total data amount of the data slice, it indicates that the data of the data slice is not completely transmitted, and the transmission success weight value of the data slice may be set to 0. If the actual transmission data amount of the data slice is equal to the total data amount of the data slice, it indicates that the data of the data slice are completely transmitted, and the transmission success weight value of the data slice may be set to a positive number.

In an embodiment, the transmission success weight value of the data slice may be set to a first constant value, which indicates that the references of each of the data slices that are successfully transmitted to the successful transmission of the first slice are the same.

In another embodiment, a transmission success weight value of the data slice may be determined according to a sequence identifier of the data slice, the closer the sequence identifier to a sequence identifier of the first slice, the greater the transmission success weight value of the data slice is. The sequence identifier may be a number. That is, the successful transmission of the data slice closer to the first slice has a greater reference to the successful transmission of the first slice.

In an embodiment, calculating, according to the transmission success weight values of each of the data slices, the data transmission success rate factor corresponding to the first slice comprises: taking a sum of the transmission success weight values of each of the data slices as the data transmission success rate factor corresponding to the first slice.

For example, calculating, according to the transmission success weight values of each of the data slices, the data transmission success rate factor corresponding to the first slice may be implemented by using the following formula:

$$Y_{(n,m)} = \sum_{i=n-z}^{n} \begin{Bmatrix} 0 & Q(i) < P(i) \\ a(i) & Q(i) = P(i) \end{Bmatrix} \quad (1)$$

In the above formula (1), n may represent a sequence identifier of the data slice to be transmitted, and m may be an identifier for a receiving end. For example, Y(5, 2) may represent a data transmission success rate factor corresponding to the 5th data slice sent to the receiving end identified as 2. z may represent the preset number. Q(i,m) may represent the actual transmission data amount of the i-th data slice sent to the receiving end identified as m. P(i) may represent the total data amount of the i-th data slice. a(i) may be a corresponding transmission success weight value when the ith data slice is successfully transmitted.

For example, the first slice is a data slice with a sequence identifier of 5, assuming that the value of a(4), a(3), a(2), and a(1) may be set to 10, 5, 2, 1, respectively. Then, when the data slice with a sequence identifier of 1 is successfully transmitted, the value of the data transmission success rate factor of the first slice may be increased by 1; and when the data slice with a sequence identifier of 4 is successfully transmitted, the value of the data transmission success rate factor of the first slice may be increased by 10.

S13: determining, according to the data transmission information, a transmission speed factor corresponding to the first slice.

According to the data transmission information, the transmission speed factor corresponding to the first slice may also be determined. The transmission speed factor may be used to indicate the transmission speed of a predetermined number of data slices before the first slice.

In an embodiment, determining, according to the data transmission information, a transmission speed factor corresponding to the first slice may specifically comprise: calculating, according to the valid time of each data slice and the actual transmission data amount of each data slice within the valid time, a transmission speed of each of the preset number of data slices before the first slice; determining a speed weight value corresponding to the transmission speed of each of the data slices; and calculating, according to transmission speeds of each of the data slices and the speed weight values corresponding to the transmission speeds of each of the data slices, the transmission speed factor corresponding to the first slice.

In an embodiment, calculating, according to the valid time of each data slice and the actual transmission data amount of each data slice within the valid time, a transmission speed of each of the preset number of data slices before the first slice may comprise: with respect to each of the data slices, dividing the actual transmission data amount of the data slice by the valid time corresponding to the data slice to acquire the transmission speed of the data slice.

The speed weight value may be configured to indicate the reference of the transmission speed of the transmitted data slice to the transmission speed of the first slice. The higher the speed weight value is, the higher the reference of the transmission speed of the transmitted data slice to the first slice transmission speed is.

In one embodiment, the speed weight value of each of the data slices may be set to a second constant value. That is, the transmission speeds of each of the data slices that have been transmitted have the same reference to the transmission speed of the first slice.

In another embodiment, a transmission speed weight value of the data slice may be determined according to a sequence identifier of the data slice, the closer the sequence identifier is to a sequence identifier of the first slice, the greater the transmission speed weight value of the data slice is. The sequence identifier is a number. That is, the transmission speed of the data slice closer to the first slice has a higher reference.

In an embodiment, calculating, according to transmission speeds of each of the data slices and the speed weight values corresponding to the transmission speeds of each of the data slices, the transmission speed factor corresponding to the first slice may comprise: summing up the transmission speeds of each of the data slices according to the speed weight values, and taking the sum as the transmission speed factor corresponding to the first slice.

S14: determining, according to the data transmission success rate factor and the transmission speed factor, transmission quality of data transmitted from the first peer node to the second peer node.

In an embodiment, determining, according to the data transmission success rate factor and the transmission speed factor, transmission quality of data transmitted from the first peer node to the second peer node may comprise: comparing a sum of the data transmission success rate factor and the transmission speed factor with a preset offset parameter; if the comparison result is greater than 0, it is determined that the transmission quality of the data transmitted from the first peer node to the second peer node is qualified; and if the comparison result is less than or equal to 0, it is determined that the transmission quality of the data transmitted from the first peer node to the second peer node is unqualified.

The value of the preset offset parameter may be set according to actual conditions.

When it is determined to be unqualified, the first peer node may be disconnected from the second peer node, such that the second peer node is connected to other peer nodes in the P2P network for data transmission.

In an application scenario, the value of the data transmission success rate factor may be 0, but the value of the transmission speed factor is greater than the preset offset parameter. It may indicate that although not all of the data slices could be transmitted by the first peer node, while the transmission speed of each of the data slices is high. In this case, the transmission quality of the first peer node is considered to be qualified.

In another application scenario, the value of the transmission speed factor may be 0, but the value of the data transmission success rate factor is greater than the preset offset parameter; it may indicate that although the transmission speed of each of the data slices in the data slices that have been transmitted by the first peer node is not high, each of the data slices could complete the data transmission within the valid time. In this case, the transmission quality of the first peer node is still considered to be qualified.

Figure 3:
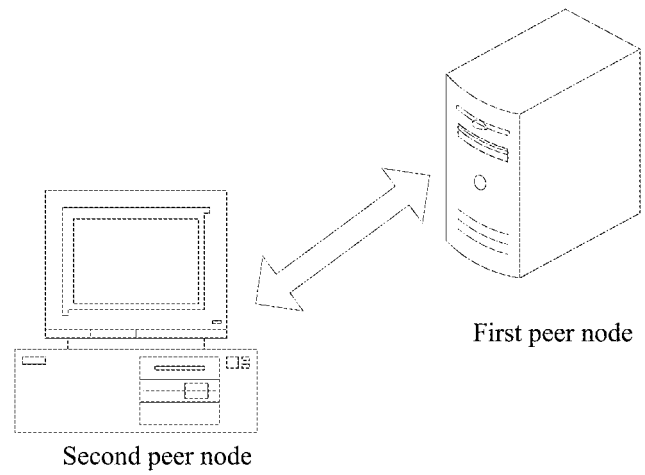
FIG. 3 is a schematic structural diagram of a system for determining transmission quality of a node in an embodiment of the present application.

Embodiments of the present application also provide a system for determining transmission quality of a node. Referring to FIG. 3, the system for determining transmission quality of a node comprises at least a first peer node and a second peer node.

The first peer node may be configured to acquire data transmission information on a preset number of data slices transmitted from a first peer node to a second peer node and before a first slice in data slices; determine, according to the data transmission information, a data transmission success rate factor corresponding to the first slice; determine, according to the data transmission information, a transmission speed factor corresponding to the first slice; and determine, according to the data transmission success rate factor and the transmission speed factor, transmission quality of data transmitted from the first peer node to the second peer node; wherein, the data transmission information comprises total data amount of each data slice, valid time of each data slice, and actual transmission data amount of each data slice within the valid time.

The second peer node may be configured to receive data slices sent by the first peer node.

Figure 4:
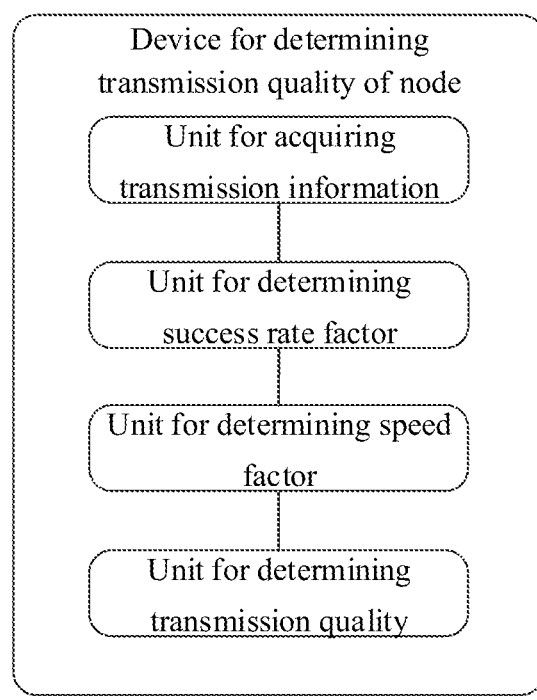
FIG. 4 is a block diagram of an apparatus for determining transmission quality of a node in an embodiment of the present application.

The embodiment of the present application further provides a device for determining transmission quality of a node, the device may be a peer node in the P2P. The device may be a client, server or server cluster. Referring to FIG. 4, the device for determining transmission quality of a node may comprise: a unit for acquiring transmission information, a unit for determining success rate factor, a unit for determining speed factor, and a unit for determining transmission quality.

The unit for acquiring transmission information may be configured to acquire data transmission information on a preset number of data slices transmitted from a first peer node to a second peer node and before a first slice in the data slices. The data transmission information comprises total data amount of each data slice, valid time of each data slice, and actual transmission data amount of each data slice within the valid time.

The unit for determining success rate factor may be configured to determine, according to the data transmission information, a data transmission success rate factor corresponding to the first slice. The unit for determining success rate factor may be specifically configured to determine a transmission success weight value of each of the preset number of data slices before the first slice, according to the total data amount of the data slice and actual transmission data amount of the data slice; and calculate, according to the transmission success weight value of each of the data slices, the data transmission success rate factor corresponding to the first slice.

The unit for determining speed factor may be configured to determine, according to the data transmission information, a transmission speed factor corresponding to the first slice. The unit for determining speed factor may be specifically configured to calculate a transmission speed of each of the preset number of data slices before the first slice, according to the valid time of each data slice and the actual transmission data amount of each data slice within the valid time; determine a speed weight value corresponding to the transmission speed of each of the data slices; and calculate the transmission speed factor corresponding to the first slice, according to transmission speeds of each of the data slices and the speed weight values corresponding to the transmission speeds of each of the data slices.

The unit for determining transmission quality may be configured to determine, according to the data transmission success rate factor and the transmission speed factor, transmission quality of data transmitted from the first peer node to the second peer node. The unit for determining transmission quality may be specifically configured to compare a sum of the data transmission success rate factor and the transmission speed factor with a preset offset parameter; if the comparison result is greater than 0, it is determined that the transmission quality of the data transmitted from the first peer node to the second peer node is qualified; and if the comparison result is less than or equal to 0, it is determined that the transmission quality of the data transmitted from the first peer node to the second peer node is unqualified.

Figure 5:
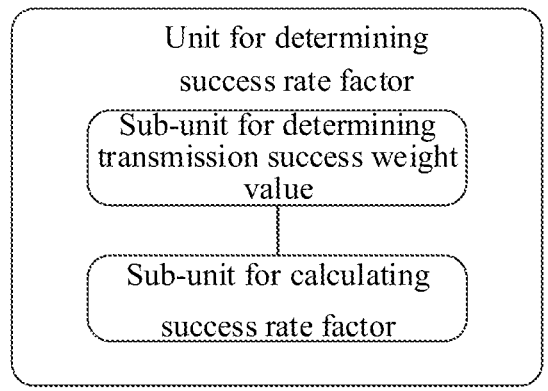
FIG. 5 is a block diagram of a unit for determining success rate factor in an apparatus embodiment of the present application.

Referring to FIG. 5, in an embodiment, the unit for determining success rate factor may specifically comprise: a sub-unit for determining transmission success weight value and a sub-unit for calculating success rate factor.

The sub-unit for determining transmission success weight value may be configured to determine a transmission success weight value of each of the preset number of data slices before the first slice, according to the total data amount of each of the data slices and the actual transmission data amount of each of the data slices.

The sub-unit for calculating success rate factor may be configured to calculate, according to the transmission success weight value of each of the data slices, the data transmission success rate factor corresponding to the first slice.

Figure 6:
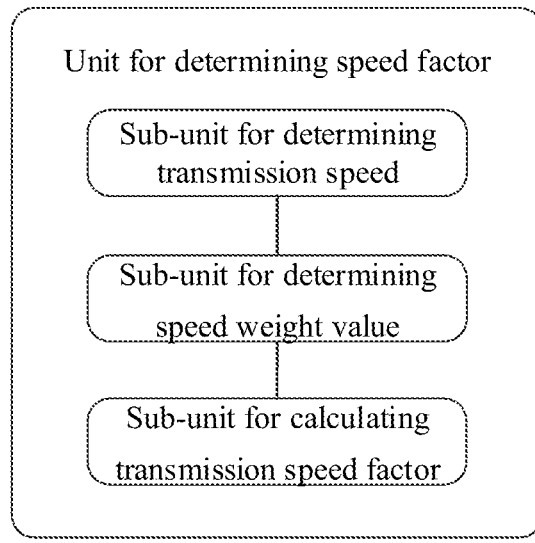
FIG. 6 is a block diagram of a unit for determining speed factor in an apparatus embodiment of the present application.

Referring to FIG. 6, in an embodiment, the speed factor determining unit may specifically comprise: a sub-unit for determining transmission speed, a sub-unit for determining speed weight value, and a sub-unit for calculating transmission speed factor.

The sub-unit for determining transmission speed may be configured to calculate a transmission speed of each of the preset number of data slices before the first slice, according to the valid time of each of the data slice and the actual transmission data amount of each of the data slice within the valid time.

The sub-unit for determining speed weight value may be configured to determine a speed weight value corresponding to the transmission speed of each of the data slices.

The sub-unit for calculating transmission speed factor may be configured to calculate, according to transmission speeds of each of the data slices and the speed weight values corresponding to the transmission speeds of each of the data slices, the transmission speed factor corresponding to the first slice.

Figure 7:
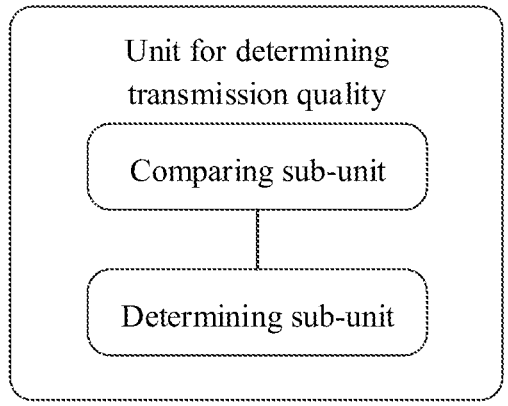
FIG. 7 is a block diagram of a unit for determining transmission quality in an apparatus embodiment of the present application.

Referring to FIG. 7, in an embodiment, the transmission quality determining unit may specifically comprise: a comparing sub-unit and a determining sub-unit.

The comparing sub-unit may be configured to compare a sum of the data transmission success rate factor and the transmission speed factor with a preset offset parameter.

The determining sub-unit may be configured to: the comparison result of the comparing sub-unit is greater than 0, it is determined that the transmission quality of the data transmitted from the first peer node to the second peer node is qualified; and if the comparison result of the comparing sub-unit is less than or equal to 0, then it is determined that the transmission quality of the data transmitted from the first peer node to the second peer node is unqualified.

Figure 8:
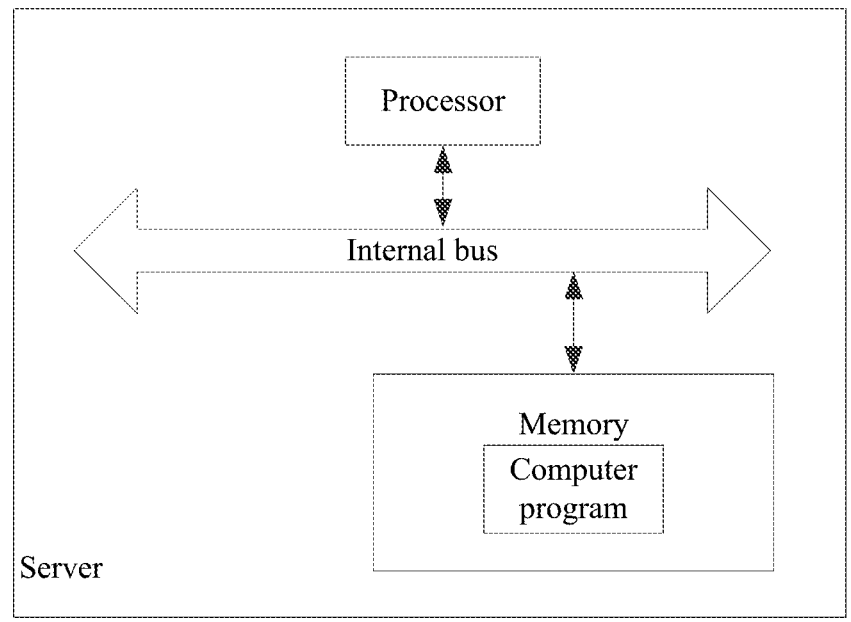
FIG. 8 is a schematic structural diagram of a server in an embodiment of the present application.
Figure 9:
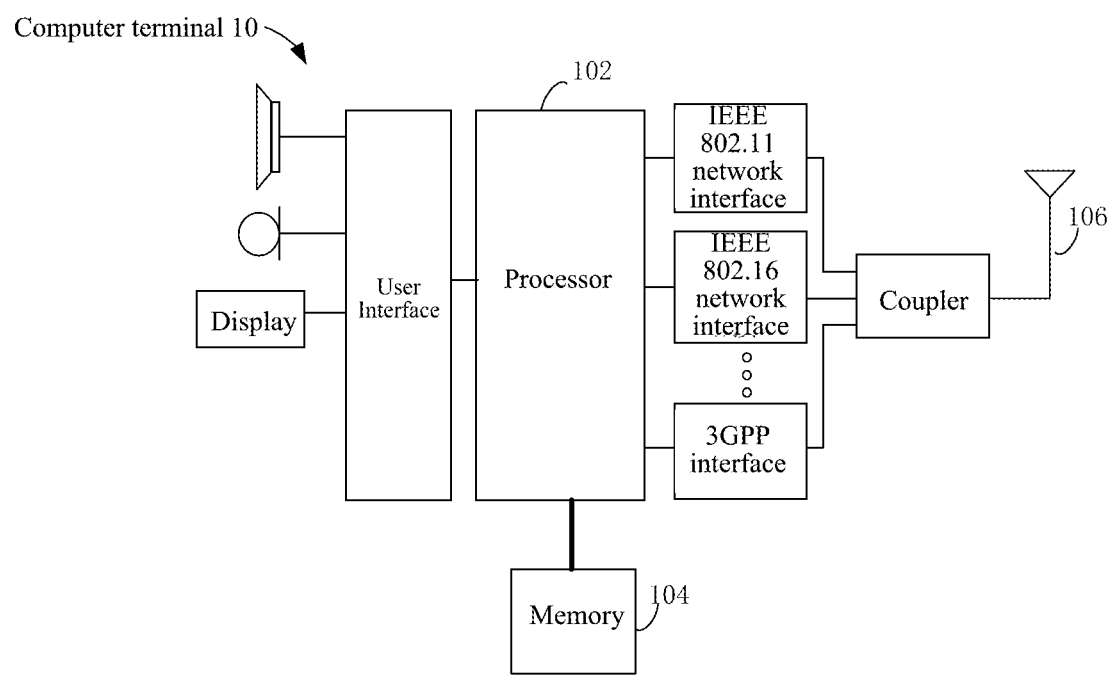
FIG. 9 is a schematic structural diagram of a computer terminal in an embodiment of the present application.

Referring to FIG. 8, the present application further provides a server comprising a memory and a processor, the memory is configured to store a computer program, and when being executed by the processor, the computer program may implement the method performed in the above method implementation Referring to FIG. 9, in the present application, the technical solution in the above embodiment may be applied to a computer terminal 10 shown in FIG. 7. The computer terminal 10 may include one or more (only one is shown) processors 102 (processor 102 may include, but is not limited to, a processing device such as a microprocessor MCU or a programmable logic device FPGA), a memory 104 for storing data, and a transmission module 106 for communication. It will be understood by those skilled in the art that the structure shown in FIG. 9 is merely illustrative, which not limit the structure of the above electronic apparatus. For example, the computer terminal 10 may also include more or fewer components than those shown in FIG. 9, or the computer terminal 10 may have a different configuration than that shown in FIG. 9.

The memory 104 may be configured to store software programs and modules of application software, and the processor 102 executes various functional applications and data processing by running software programs and modules stored in the memory 104. The memory 104 may include high speed random access memory, and may also include non-volatile memory such as one or more magnetic storage devices, flash memories, or other non-volatile solid state memories. In some examples, the memory 104 may further include a memory remotely located relative to processor 102, which may be coupled to the computer terminal 10 via a network. Examples of such networks include, but are not limited to, the internet, intranets, local area networks, mobile communication networks, and combinations thereof.

Specifically, in the present application, the deployment method for the above-described server may be stored as a computer program in the above-described memory 104, the memory 104 may be coupled to the processor 102, and when the processor 102 executes the computer program stored in the memory 104, the steps in the above-mentioned server deployment method may be implemented.

The transmssion module 106 is configured to receive or transmit data via a network. The specific examples of the network described above may include a wireless network provided by a communication provider of the computer terminal 10. In one example, the transmission module 106 includes a Network Interface Controller (NIC) that may be connected to other network devices through a base station so as to communicate with the Internet. In one example, the transmission module 106 may be a Radio Frequency (RF) module for communicating with the Internet wirelessly.

Therefore, the technical solution provided by an embodiment of the present application acquires data transmission information of a data slice that has been transmitted by the first peer node and before the first slice for providing data, the data transmission information comprising total data amount of each data slice, valid time of each data slice, and actual transmission data amount of each data slice within the valid time; and then respectively calculates data transmission success rate factor and transmission speed factor corresponding to the first slice according to the data transmission information, wherein, the data transmission success rate factor is related to the success rate of the transmitted data slices, and the transmission speed factor is related to the transmission speeds of the transmitted data slices. As such, the calculated data transmission success rate factor and transmission speed factor could well reflect the transmission quality of each of the data slices before the first slice being transmitted, and thus could be used for pre-determining whether the transmission quality is good before the first slice is transmitted by the first peer node. Therefore, the transmission quality of the node may be determined timely at the first peer node (that is, the transmitting end), thus improving the P2P efficiency. At the same time, the selected data transmission information is the transmission information of several data slices adjacent to the first slice, which would grantee that the data transmission information configured for determining the quality of node is the data transmission information during a short time, and the accuracy of the determination result may be ensured.

Through the description of the above embodiments, those skilled in the art could clearly understand that the embodiments can be implemented by means of software plus a necessary general hardware platform, and of course, the embodiment may also be implemented by hardware. Based on such understanding, the essence or the part making contributions to the prior art of the above described technical solutions may be embodied in the form of software product. The computer software product may be stored in a computer readable storage medium such as ROM/RAM, magnetic discs, optical discs, etc., and includes instructions for causing a computer device (which may be a personal computer, server, or network device, etc.) to perform the methods described in various embodiments or portions of the embodiments.

The above description describes only the preferred embodiments of the present application, which are not intended to limit the application. Any modifications, equivalent substitutions, improvements, etc. that fall within the spirit and principle of the present application are to be embraced within the scope of the present application.

What is claimed:

1. A method for determining transmission quality of a node, comprising:

acquiring data transmission information on a preset number of data slices transmitted from a first peer node to a second peer node and before a first slice in the data slices;

determining, according to the data transmission information, a data transmission success rate factor corresponding to the first slice;

determining, according to the data transmission information, a transmission speed factor corresponding to the first slice; and determining, according to the data transmission success rate factor and the transmission speed factor, transmission quality of data transmitted from the first peer node to the second peer node;

wherein the first slice is configured to represent a data slice to be transmitted immediately; and the data transmission information comprises total data amount of each of the data slices, valid time of each of the data slices, and actual transmission data amount of each of the data slices within the valid time.

2. The method according to claim 1, wherein determining, according to the data transmission information, a data transmission success rate factor corresponding to the first slice comprises:

determining a transmission success weight value of each of the preset number of data slices before the first slice, according to the total data amount of each of the data slices and the actual transmission data amount of each of the data slices; and calculating, according to the transmission success weight values of each of the data slices, the data transmission success rate factor corresponding to the first slice.

3. The method according to claim 2, wherein determining a transmission success weight value of each of the preset number of data slices before the first slice, according to the total data amount of the data slice and the actual transmission data amount of the data slice comprises:

comparing the actual transmission data amount of the data slice with the total data amount of the data slice;

if the actual transmission data amount of the data slice is less than the total data amount of the data slice, the transmission success weight value of the data slice is 0; and if the actual transmission data amount of the data slice is equal to the total data amount of the data slice, the transmission success weight value of the data slice is determined according to a preset rule, and the transmission success weight value is determined to be greater than 0.

4. The method according to claim 3, wherein the preset rule comprises:

setting the transmission success weight value of the data slice to a first constant value; or determining the transmission success weight value of the data slice according to a sequence identifier of the data slice, the closer the sequence identifier is to a sequence identifier of the first slice, the higher the transmission success weight value of the data slice is; wherein, the sequence identifier is a number.

5. The method according to claim 2, wherein calculating, according to the transmission success weight values of each of the data slices, the data transmission success rate factor corresponding to the first slice comprises: taking a sum of the transmission success weight values of each of the data slices as the data transmission success rate factor corresponding to the first slice.

6. The method according to claim 1, wherein determining, according to the data transmission information, a transmission speed factor corresponding to the first slice comprises:
    calculating a transmission speed of each of the preset number of data slices before the first slice, according to the valid time of each of the data slices and the actual transmission data amount of each of the data slices within the valid time;
    determining a speed weight value corresponding to the transmission speed of each of the data slices; and
    calculating the transmission speed factor corresponding to the first slice, according to transmission speeds of each of the data slices and the speed weight values corresponding to the transmission speeds of each of the data slices.

7. The method according to claim 6, wherein determining a speed weight value corresponding to the transmission speed of each of the data slices comprises:
    setting the speed weight value of each of the data slices to a second constant value; or
    determining the transmission speed weight value of each of the data slices according to a sequence identifier of the data slice, the closer the sequence identifier is to a sequence identifier of the first slice, the higher the transmission speed weight value of the data slice is; the sequence identifier is a number.

8. The method according to claim 6, wherein calculating the transmission speed factor corresponding to the first slice, according to transmission speeds of each of the data slices and the speed weight values corresponding to the transmission speeds of each of the data slices comprises:
    summing up the transmission speeds of each of the data slices according to the speed weight value, and taking the sum as the transmission speed factor corresponding to the first slice.

9. The method according to claim 1, wherein determining, according to the data transmission success rate factor and the transmission speed factor, transmission quality of data transmitted from the first peer node to the second peer node comprises:
    comparing a sum of the data transmission success rate factor and the transmission speed factor with a preset offset parameter;
    if a comparison result is greater than 0, it is determined that the transmission quality of the data transmitted from the first peer node to the second peer node is qualified; and if the comparison result is less than or equal to 0, it is determined that the transmission quality of the data transmitted from the first peer node to the second peer node is unqualified.

10. A device for determining transmission quality of a node, comprising: processor coupled to a memory storage, the process executing instructions stored in the memory storage to provide: a unit for acquiring transmission information, a unit for determining success rate factor, a unit for determining speed factor, and a unit for determining transmission quality; wherein
    the unit for acquiring transmission information is configured to acquire data transmission information on a preset number of data slices transmitted from a first peer node to a second peer node and before a first slice in the data slices; the data transmission information comprises total data amount of each of the data slices, valid time of each of the data slices, and actual transmission data amount of each of the data slices within the valid time;
    the unit for determining success rate factor is configured to determine, according to the data transmission information, a data transmission success rate factor corresponding to the first slice;
    the unit for determining speed factor is configured to determine, according to the data transmission information, a transmission speed factor corresponding to the first slice; and
    the unit for determining transmission quality is configured to determine, according to the data transmission success rate factor and the transmission speed factor, transmission quality of data transmitted from the first peer node to the second peer node;
    wherein the first slice is configured to represent a data slice to be transmitted immediately.

11. The device according to claim 10, wherein the unit for determining success rate factor comprises: a sub-unit for determining transmission success weight value and a sub-unit for calculating success rate factor; wherein
    the sub-unit for determining transmission success weight value is configured to determine a transmission success weight value of each of the preset number of data slices before the first slice, according to the total data amount of each of the data slices and the actual transmission data amount of each of the data slices;
    the sub-unit for calculating success rate factor is configured to calculate, according to the transmission success weight values of each of the data slices, the data transmission success rate factor corresponding to the first slice.

12. The device according to claim 10, wherein the unit for determining speed factor comprises: a sub-unit for determining transmission speed, a sub-unit for determining speed weight value, and a sub-unit for calculating transmission speed factor; wherein
    the sub-unit for determining transmission speed is configured to calculate a transmission speed of each of the preset number of data slices before the first slice, according to the valid time of each of the data slices and the actual transmission data amount of each of the data slices within the valid time;
    the sub-unit for determining speed weight value is configured to determine a speed weight value corresponding to the transmission speed of each of the data slices;
    the sub-unit for calculating transmission speed factor is configured to calculate the transmission speed factor corresponding to the first slice, according to transmission speeds of each of the data slices and the speed weight values corresponding to the transmission speeds of each of the data slices.

13. The device according to claim 10, wherein the unit for determining transmission quality comprises: a comparing sub-unit and a determining sub-unit; wherein
    the comparing sub-unit is configured to compare a sum of the data transmission success rate factor and the transmission speed factor with a preset offset parameter;
    the determining sub-unit is configured to: if the comparison result of the comparing sub-unit is greater than 0, it is determined that the transmission quality of the data transmitted from the first peer node to the second peer node is qualified; and if the comparison result of the comparing sub-unit is less than or equal to 0, the it is determined that the transmission quality of the data transmitted from the first peer node to the second peer node is unqualified.

14. A server, comprising a memory and a processor, wherein, the memory is configured for storing a computer program that, when being executed by the processor, implements the method for determining transmission quality of a node, comprising:

acquiring data transmission information on a preset number of data slices transmitted from a first peer node to a second peer node and before a first slice in the data slices;

determining, according to the data transmission information, a data transmission success rate factor corresponding to the first slice;

determining, according to the data transmission information, a transmission speed factor corresponding to the first slice; and determining, according to the data transmission success rate factor and the transmission speed factor, transmission quality of data transmitted from the first peer node to the second peer node;

wherein the first slice is configured to represent a data slice to be transmitted immediately; and the data transmission information comprises total data amount of each of the data slices, valid time of each of the data slices, and actual transmission data amount of each of the data slices within the valid time.

15. The server according to claim 14, wherein determining, according to the data transmission information, a data transmission success rate factor corresponding to the first slice comprises:

determining a transmission success weight value of each of the preset number of data slices before the first slice, according to the total data amount of each of the data slices and the actual transmission data amount of each of the data slices; and calculating, according to the transmission success weight values of each of the data slices, the data transmission success rate factor corresponding to the first slice.

16. The server according to claim 15, wherein determining a transmission success weight value of each of the preset number of data slices before the first slice, according to the total data amount of the data slice and the actual transmission data amount of the data slice comprises:

comparing the actual transmission data amount of the data slice with the total data amount of the data slice;

if the actual transmission data amount of the data slice is less than the total data amount of the data slice, the transmission success weight value of the data slice is 0; and if the actual transmission data amount of the data slice is equal to the total data amount of the data slice, the transmission success weight value of the data slice is determined according to a preset rule, and the transmission success weight value is determined to be greater than 0.

17. The server according to claim 16, wherein the preset rule comprises:

setting the transmission success weight value of the data slice to a first constant value; or determining the transmission success weight value of the data slice according to a sequence identifier of the data slice, the closer the sequence identifier is to a sequence identifier of the first slice, the higher the transmission success weight value of the data slice is; wherein, the sequence identifier is a number.

18. The server according to claim 15, wherein calculating, according to the transmission success weight values of each of the data slices, the data transmission success rate factor corresponding to the first slice comprises: taking a sum of the transmission success weight values of each of the data slices as the data transmission success rate factor corresponding to the first slice.

* * * * *